US010193362B2

(12) United States Patent
Xiao et al.

(10) Patent No.: US 10,193,362 B2
(45) Date of Patent: Jan. 29, 2019

(54) TERMINAL STAND AND WIRELESS CHARGING DEVICE

(71) Applicant: ZTE CORPORATION, Shenzhen, Guangdong Province (CN)

(72) Inventors: Zhihua Xiao, Shenzhen (CN); Chang Xu, Shenzhen (CN); Cuifeng Chen, Shenzhen (CN); Zhiyuan Chen, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 263 days.

(21) Appl. No.: 15/121,047

(22) PCT Filed: Apr. 15, 2014

(86) PCT No.: PCT/CN2014/075390
§ 371 (c)(1),
(2) Date: Aug. 24, 2016

(87) PCT Pub. No.: WO2015/131430
PCT Pub. Date: Sep. 11, 2015

(65) Prior Publication Data
US 2016/0380453 A1 Dec. 29, 2016

(30) Foreign Application Priority Data

Mar. 6, 2014 (CN) .......................... 2014 1 0080661

(51) Int. Cl.
H02J 7/00 (2006.01)
H04M 1/04 (2006.01)
(Continued)

(52) U.S. Cl.
CPC .......... H02J 7/0042 (2013.01); G06F 1/1632 (2013.01); H01F 7/06 (2013.01);
(Continued)

(58) Field of Classification Search
CPC ....................................................... H02J 7/025
USPC ........................................................ 320/108
See application file for complete search history.

(56) References Cited

U.S. PATENT DOCUMENTS 5,525,888 A * 6/1996 Toya ................... H01M 2/1022
320/110
6,046,571 A * 4/2000 Bovio ................... G06F 1/1632
320/107
(Continued)

FOREIGN PATENT DOCUMENTS

CN 202167887 U 3/2012
CN 102545326 A 7/2012
(Continued)

Primary Examiner — Yalkew Fantu
(74) Attorney, Agent, or Firm — Ling Wu; Stephan Yang; Ling and Yang Intellectual Property

(57) ABSTRACT

A terminal support and a wireless charging device are disclosed. The terminal support includes a base with a placing surface used for placing a terminal; a force generation module; and a control module connected to the force generation module, wherein the control module is configured to control the force generation module to generate a force which acts on the terminal to change a relative position relationship between the terminal and the placing surface. A wireless charging device is further disclosed and the wireless charging device includes the terminal support. The terminal support controls the terminal placed on the base, the terminal and the placing surface are controlled to produce relative movement therebetween, and corresponding control can be performed according to a state parameter of the terminal or an instruction input by a user.

11 Claims, 3 Drawing Sheets

(51) Int. Cl.
*H02J 50/10* (2016.01)
*H02J 50/90* (2016.01)
*H01F 7/06* (2006.01)
*H02J 7/02* (2016.01)
*G06F 1/16* (2006.01)
*H04M 1/725* (2006.01)

(52) U.S. Cl.
CPC .............. *H01F 7/064* (2013.01); *H02J 7/025* (2013.01); *H02J 50/10* (2016.02); *H02J 50/90* (2016.02); *H04M 1/04* (2013.01); *H04M 1/72527* (2013.01)

(56) References Cited

U.S. PATENT DOCUMENTS

| | | | | |
|---|---|---|---|---|
| 6,532,152 | B1* | 3/2003 | White | G02F 1/133308 312/223.1 |
| 8,234,509 | B2* | 7/2012 | Gioscia | G06F 1/1632 713/300 |
| 2007/0035917 | A1* | 2/2007 | Hotelling | G06F 1/1632 361/679.56 |
| 2010/0141217 | A1 | 6/2010 | Morris et al. | |
| 2013/0058023 | A1* | 3/2013 | Supran | G06F 1/1632 361/679.01 |

FOREIGN PATENT DOCUMENTS

| | | |
|---|---|---|
| CN | 102594990 A | 7/2012 |
| CN | 102738838 A | 10/2012 |
| CN | 203119520 | 8/2013 |
| GB | 2445598 A | 7/2008 |

\* cited by examiner

Electromagnet A　　　　Electromagnet B　　　　Electromagnet C

TERMINAL STAND AND WIRELESS CHARGING DEVICE

TECHNICAL FIELD

The present document relates to the field of communication, in particular to a terminal support and a wireless charging device.

BACKGROUND OF THE RELATED ART

High-definition large-screen high configuration and thinning of current mobile phones are main design trends, and a very great pressure is caused to battery life of the mobile phones. Therefore, the mobile phones are more frequently charged than ever before. However, currently the user experience of the mobile phones in a charging state is not very humanized.

Defects existing at present include the following:

1. For the traditional wired charging, a charging line needs to be unplugged when an incoming call arrives. Otherwise, mobile phone radiation is very great. The charging line needs to be plugged again after a conversation is ended and this process requires both hands to collaboratively operate.

2. For the current wireless charging, a mobile phone needs to be picked up when an incoming call arrives; and the mobile phone needs to be placed back into a wireless base and be accurately placed in an effective charging area after a conversation is ended.

3. When the charging is ended, a user can know whether the charging is completed only by manually lighting up a screen and viewing a battery indicator displayed on the screen.

SUMMARY

In view of this, in order to solve the technical problem existing in the existing art, the embodiments of the present document provide a terminal support and a wireless charging device.

The embodiment of the present document adopts a technical solution as follows: a terminal support includes:

a base with a placing surface used for placing a terminal;

a force generation module; and a control module configured to control the force generation module to generate a force which acts on the terminal to change a relative position relationship between the terminal and the placing surface.

Preferably, the terminal support further includes a detection module connected with the control module, and the detection module is configured to acquire a detection signal of a state parameter of the terminal or an instruction input by a user and send the detection signal to the control module to make the control module control the force generation module according to the detection signal to generate a force on the terminal.

Preferably, the state parameter of the terminal is a charging progress of the terminal or a working state of the terminal.

Preferably, the detection module includes a camera, and the detection module is configured to acquire whether a distance between the user and the terminal is within a preset range.

Preferably, the force generation module is configured to apply one or a combination of a magnetic force, an attraction force and a repelling force to the terminal to change the relative position relationship between the terminal and the placing surface.

Preferably, the placing surface is a curved surface, a flat surface or a concave-convex surface.

Preferably, the force generation module includes a first electromagnet and a second electromagnet, and the first electromagnet and the second electromagnet are located at different positions on the placing surface.

Preferably, the first electromagnet is located at a position of a first height on the placing surface, and the second electromagnet is located at a position of a second height lower than the first height on the placing surface.

Preferably, the force generation module further includes a third electromagnet, and the third electromagnet is located at a position of a third height lower than the first height on the placing surface.

The embodiment of the present document further provides a wireless charging device, including the above mentioned terminal support and further including a wireless charging module connected with a control module and configured to perform wireless charging on a terminal placed on the placing surface.

The embodiment of the present document has the following beneficial effects: the terminal support provided by the embodiment of the present document controls the terminal placed on the base, the terminal and the placing surface are controlled to produce relative movement therebetween, and corresponding control can be performed according to the state parameter of the terminal or the instruction input by the user. Since the state parameter of the terminal can be indicated according to the relative position between the terminal and the placing surface, which facilitates intuitive judgment, realizes the visualization, thus the user experience is improved.

SPECIFIED EMBODIMENTS

In order to make the technical problems to be solved by the present document, the technical solution and the advantages be clearer, the present document will be described below in detail in combination with the drawings and the specified embodiments.

Figure 1:
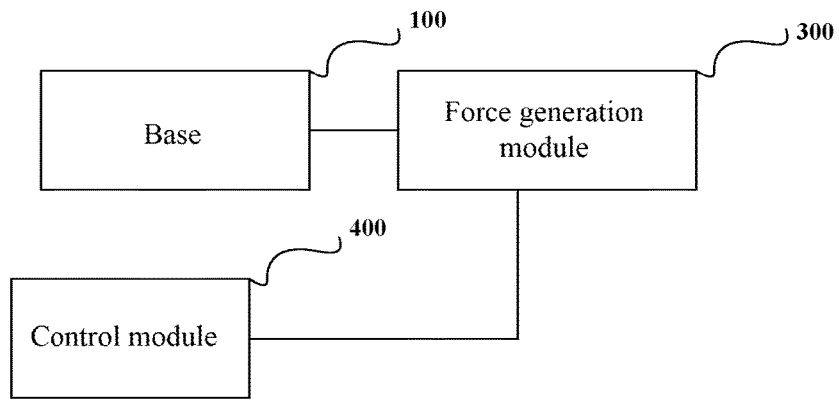
FIG. 1 is a structural diagram of a terminal support according to a first embodiment of the present document.

As illustrated in FIG. 1, the FIG. 1 is a structural diagram of a terminal support according to a first embodiment of the present document, the terminal support includes:

a base 100 with a placing surface used for placing a terminal;

a force generation module 300; and a control module 400 used to control the force generation module to generate a force which acts on the terminal to change a relative position relationship between the terminal and the placing surface.

The terminal support provided by the embodiment of the present document controls the terminal placed on the base, the terminal and the placing surface are controlled to produce relative movement therebetween, and corresponding control can be performed according to a state parameter of the terminal or an instruction input by a user. Since the state parameter of the terminal can be indicated according to the relative position between the terminal and the placing surface, which facilitates intuitive judgment, and realizes the visualization, thus the user experience is improved.

The base 100 in the embodiment of the present document has a placing surface for placing a terminal, and the placing surface may be a flat surface, a curved surface or a concave-convex surface or the like, as long as the terminal can be placed. The placing surface of the base may be a concave surface, a convex surface or a concave-convex surface for supporting the terminal.

The force generation module 300 in the embodiment of the present document is configured to generate a force on the terminal to change the relative position relationship between the terminal and the placing surface under the action of the control module. The change of the relative position between the terminal and the placing surface may be that the terminal is moved from a first position to a second position on the placing surface, or a placing angle of the terminal on the placing surface changes, or a height of the terminal on the placing surface changes, etc. The force generated by the force generation module may be a magnetic force, a mechanical force, an attraction force or a pushing force, etc., as long as the force can implement the change of the relative position between the terminal and the placing surface.

The control module 400 in the embodiment of the present document is configured to apply a control signal to the force generation module to make the force generation module apply a force to the terminal such that a position change is produced between the terminal and the placing surface. The control module specifically applies a control signal to the force generation module according to a state parameter of the terminal or an instruction input by a user, and the state parameter of the terminal may be a working state or a charging state or the like of the terminal. When the terminal is to be in a working state or charged power reaches a preset value, the force generation module generates a control signal such that the force generation module applies a force to the terminal to change the position relationship between the terminal and the placing surface. The control module may further apply a control signal to the force generation module according to an instruction input by a user such that the force generation module applies a force to the terminal according to the instruction input by the user.

Figure 2:
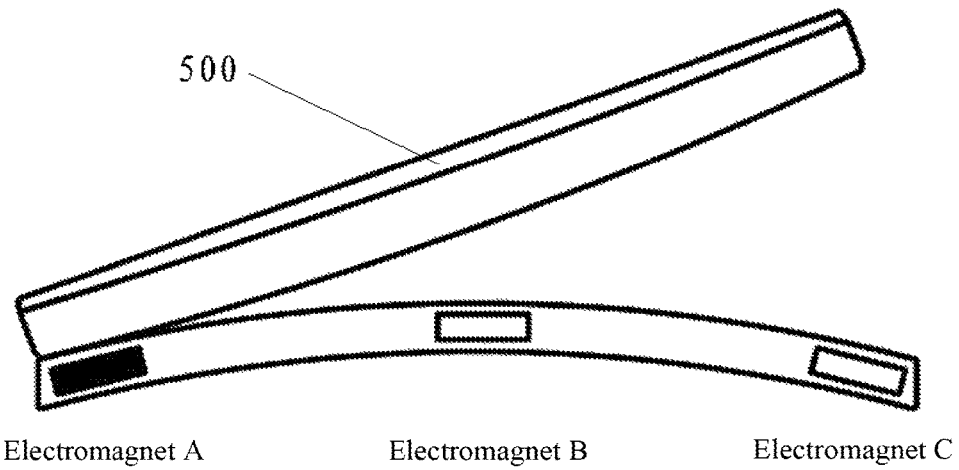
FIG. 2 is a schematic view of a first state that a terminal is placed on a base according to an embodiment of the present document.
Figure 3:
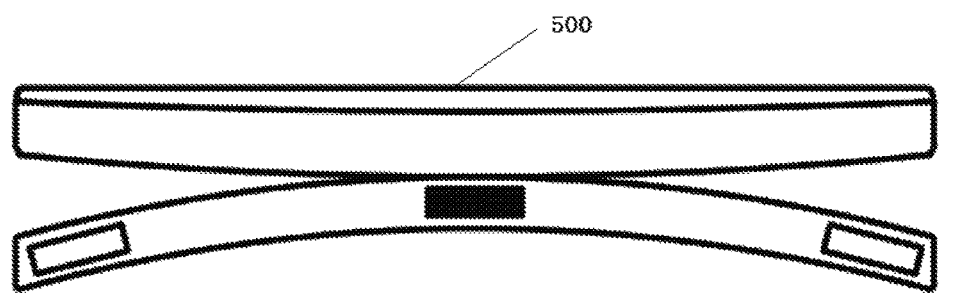
FIG. 3 is a schematic view of a second state that a terminal is placed on a base according to one embodiment of the present document.
Figure 4:
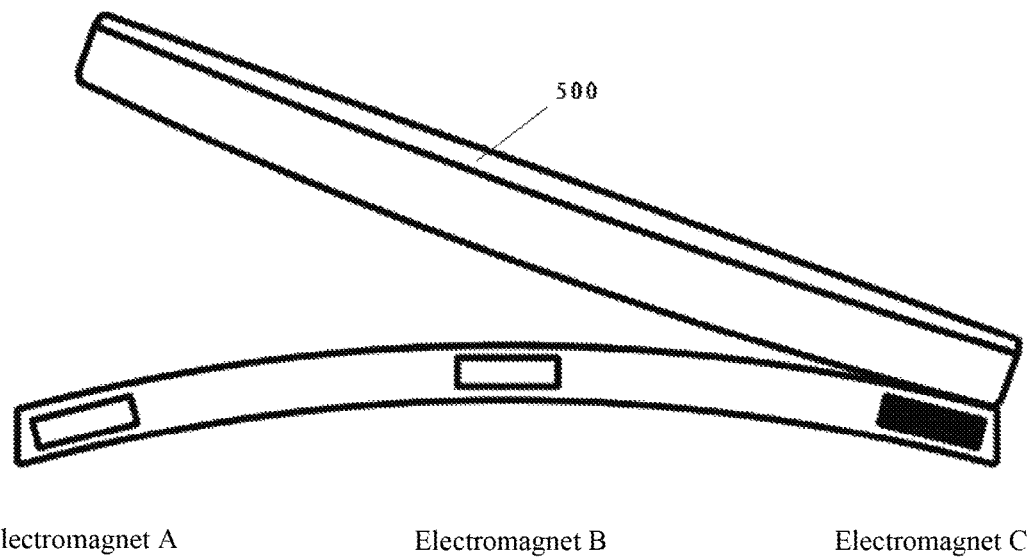
FIG. 4 is a schematic view of a third state that a terminal is placed on a base according to one embodiment of the present document.

As illustrated in FIGS. 2-4, FIGS. 2-4 are schematic views of different states that a terminal is placed on a base according to an embodiment, the placing surface in the embodiment is a convex curved surface and the terminal in each state is located at a different position on the placing surface. The force generation module in the embodiment makes the position between the terminal and the placing surface change through a magnetic force. The force generation module in the embodiment includes an electromagnet A, an electromagnet B and an electromagnet C, the electromagnet B is arranged in a middle area of the curved surface, the electromagnet A and the electromagnet C are arranged on two sides of the curved surface, the position of the electromagnet B is higher than the positions of the electromagnet A and the electromagnet C, and the heights of the electromagnet A and the electromagnet C may be the same or different. When any one of the electromagnets A, B and C works, an electromagnetic force is generated such that the terminal 500 is attracted to a position corresponding to the electromagnet on the placing surface. As illustrated in FIG. 3, the FIG. 3 is a schematic view of a state in which the terminal is horizontally placed, and in the state the electromagnet B is energized to generate a magnetic force such that a mobile phone is attracted in the middle area of the curved surface and is horizontally placed. As illustrated in FIG. 2 and FIG. 4, the FIG. 2 and FIG. 4 are schematic views of states in which the terminal is obliquely placed, the electromagnets A and C are energized to generate magnetic forces such that the mobile phone is attracted in areas on the two sides of the curved surface and is obliquely placed. The control module may control any one of the electromagnets A, B and C to be energized, and may control switches connected with the electromagnets to make one of the electromagnets to generate the magnetic force such that the mobile phone is attracted to the position of the energized electromagnet. Therefore, in the embodiment, the state parameter of the mobile phone is determined according to the position of the electromagnet to which the mobile phone is attracted, the state of the mobile phone is reflected through the position change, thus the visualization is realized and the user experience is improved. Certainly, in the embodiment, the corresponding electromagnet may also be controlled to be energized according to an instruction input by a user. For example, when an input instruction is the electromagnet A to be energized, the electromagnet A generates a magnetic force for attracting the terminal; and when an input instruction is the electromagnet B to be energized, the electromagnet B generates a magnetic force for attracting the terminal.

Figure 5:
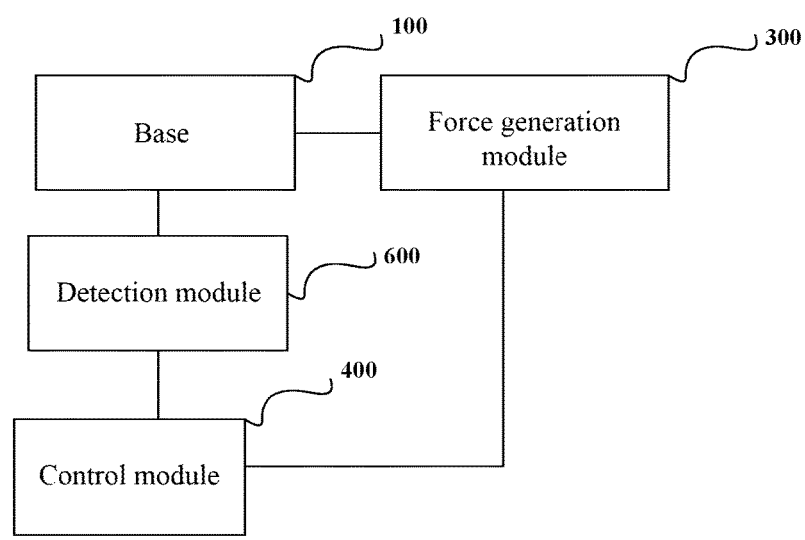
FIG. 5 is a structural diagram of a terminal support according to a second embodiment of the present document.

As illustrated in FIG. 5, FIG. 5 is a structural diagram of a terminal support according to a second embodiment of the present document. The terminal support in this embodiment is substantially the same as the terminal support in the first embodiment and the difference is that the terminal support in this embodiment further includes a detection module 600 configured to acquire a detection signal of a state parameter of the terminal or an instruction input by a user and send the detection signal to the control module such that the control module controls the force generation module according to the detection signal to generate a force on the terminal. The detection module 600 is configured to acquire the detection signal of a state parameter of the terminal or an instruction input by a user and send the detection signal to the control module such that the control module applies a control signal to the force generation module according to the detection signal.

In an embodiment, the detection module is configured to acquire a charging progress of the terminal or an instruction input by a user. When it is detected that the charging progress of the terminal reaches a preset value, a detection signal is sent to the control module such that the control module controls the relative position between the terminal and the placing surface to change according to the detection signal. For example, if the preset value is 100%, when the charging progress of the terminal is less than 100%, the control module controls the electromagnet B to be conducted such that the terminal is attracted in a middle area of the placing surface and is in a horizontally placing state. When the charging progress of the terminal reaches 100%, the control module controls the electromagnet A or C to be conducted such that the terminal is attracted in an area on the two sides of the placing surface and is in an obliquely placing state. Certainly, the preset value may further be any value within the range of 0-100% and may be set as needed. In this embodiment, by observing the placing state of the terminal, the charging progress of the terminal may be determined and thus the user experience is improved.

In another embodiment, the detection module includes a camera, and the camera may be a camera of a mobile phone itself, may also be an independently installed camera and is used for acquiring images surrounding the mobile phone in real time. When a distance from the user to the mobile phone is within a preset range, a detection signal is generated such that the control module applies a control signal to the force generation module according to the detection signal to make the relative position between the terminal and the placing surface change. For example, when the user needs to make a conversation, play a video or browse a webpage or the like during charging, a distance to a face of the user getting close is detected, a detection signal is sent to the control module and the control module applies a control signal to the force generation module according to the detection signal such that the position between the terminal and the placing surface is changed.

In this embodiment, when the distance from the user to the terminal exceeds the preset range, the electromagnet B is energized to produce an adsorption force to attract the terminal to the middle area of the placing surface and the terminal is horizontally placed. When the distance from the user to the terminal is within the preset range, the electromagnet A or C is energized to produce an adsorption force to attract the terminal to the electromagnet A or C such that the relative position between the terminal and the placing surface is changed. Further, when the distance from the user to the terminal is within the preset range, whether the user is close to the side of the electromagnet A or the side of the electromagnetic C may be detected, so as to select one of the electromagnets to generate an adsorption force. In this embodiment, the detection signal may be sent to the control module by detecting whether the distance from the user to the terminal is within the preset range, such that the detection module applies a control signal to the force generation module according to the detection signal, the terminal is obliquely placed when the distance from the user to the placing surface is less than the preset range, a visible angle between the terminal and the base is produced and a conversation operation performed by the user is facilitated.

Figure 6:
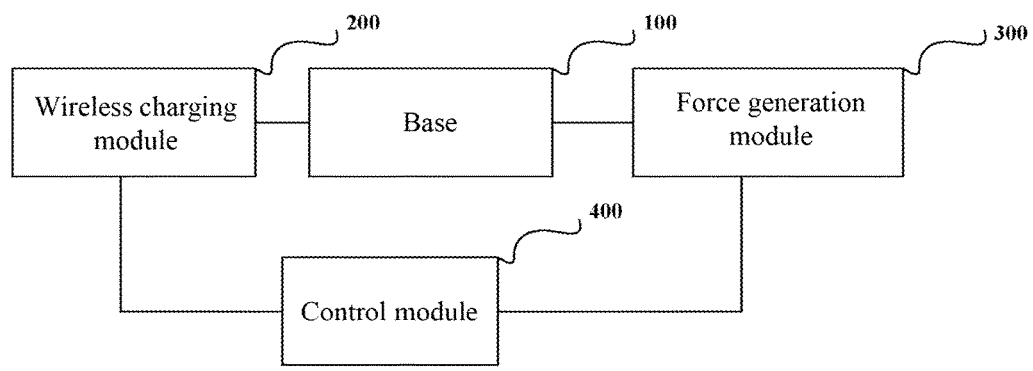
FIG. 6 is a structural diagram of a wireless charging device according to a first embodiment of the present document.

As illustrated in FIG. 6, the FIG. 6 is a structural diagram of a wireless charging device according to a first embodiment of the present document, the wireless charging device provided by this embodiment includes the terminal support and further includes a wireless charging module 200 connected with the control module, and the wireless charging module 200 is configured to perform wireless charging on the terminal placed on the placing surface, and the wireless charging module may charge the terminal by adopting the existing art. In a wireless charging module, a coil and an oscillating circuit are included and wireless charging is performed on the terminal within the preset range. The wireless charging module may work or stop working according to the action of the control module, and may work according to the instruction received from the control module, and certainly, the wireless charging module may also work independently rather than according to the control of the control module.

Figure 7:
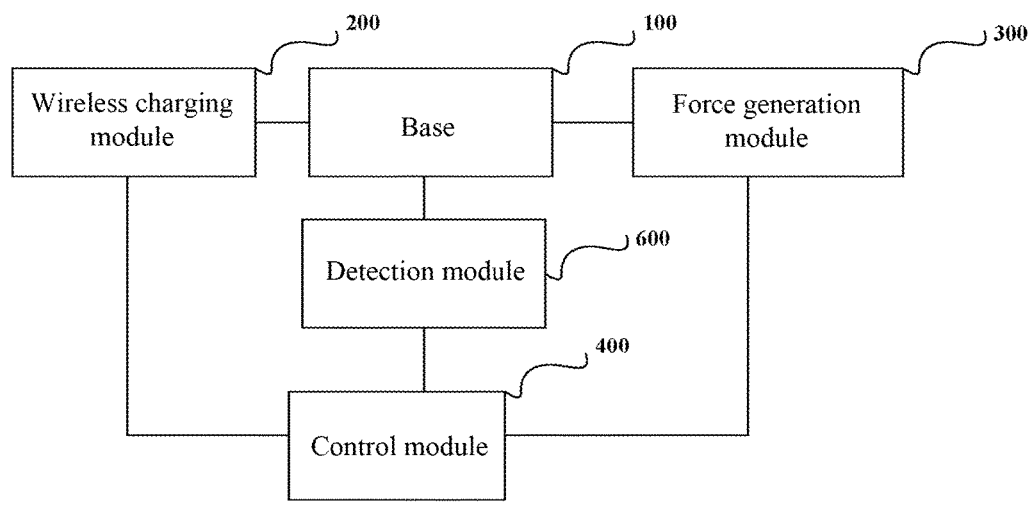
FIG. 7 is a structural diagram of a wireless charging device according to a second embodiment of the present document.

As illustrated in FIG. 7, the FIG. 7 is a structural diagram of a wireless charging device according to a second embodiment of the present document, the wireless charging device is substantially the same as the wireless charging device in the first embodiment and the difference is that the wireless charging device further includes a detection module 600 configured to acquire a detection signal of a state parameter of the terminal or an instruction input by a user and send the detection signal to the control module such that the control module controls the force generation module according to the detection signal to generate a force on the terminal. The detection module 600 is configured to acquire a detection signal of a state parameter of the terminal or an instruction input by a user and send the detection signal to the control module such that the control module applies a control signal to the force generation module according to the detection signal.

In the technical solution, the terminal placed on the base is controlled, the terminal and the placing surface are controlled to produce relative movement therebetween and corresponding control can be performed according to the state parameter of the terminal. Since the state parameter of the terminal can be indicated according to the relative position between the terminal and the placing surface, which facilitates intuitive judgment, realizes the visualization and thus the user experience is improved.

In the embodiments provided by the present application, it should be understood that the disclosed apparatus or method may be implemented in other ways. The apparatus embodiment described above is just exemplary. For example, division of units is just a division by logic functions, other dividing ways may be adopted during actual implementation, e.g., a plurality of units or components may be combined or may be integrated in another system, or some features may be neglected or not executed. In addition, coupling, direct coupling or communication connection between the components which are illustrated or discussed may be indirect coupling or communication connection through some interfaces, apparatus or units, and may be electrical, mechanical or other forms.

Units which are described above as discrete parts may be or may also not be physically separated; parts illustrated as a unit may be or may also not be physical units, not only can be located at the same position, but also can be distributed at a plurality of network units; and partial or all units may be selected according to the actual needs to realize the purpose of the solution of the embodiment.

In addition, all function units in the embodiments of the present document may be fully integrated in one processing unit and each unit may also be respectively used as a separate unit, and two or more units may also be integrated in one unit; and the integrated units may be implemented by means of hardware and may also be implemented by means of hardware and software function units.

One ordinary person skilled in the art can understand that all or partial steps in the above-mentioned method embodiments can be completed by relevant hardware instructed by a program, and the program can be stored in a computer readable storage medium, and when the program is executed, the steps in the above-mentioned method embodiments are executed; and the foresaid storage medium includes various mediums capable of storing program codes, such as a mobile storage device, a Read-Only Memory (ROM), a Random Access Memory (RAM), a magnetic disk or a compact disk, etc.

Or, in the present document, if the integrated units are implemented by means of software function modules and are sold or used as independent products, the units may also be stored in a computer readable storage medium. Based on such understanding, the technical solution of the embodiment of the present document substantially or the portion which makes a contribution to the existing art may be reflected by means of software product, the computer software product is stored in a storage medium and includes a plurality of instructions which make a computer device (which may be a personal computer, a server or a network device) execute all or partial steps of the method provided by each embodiment of the present document. The foresaid storage medium includes various mediums capable of storing program codes, such as a mobile storage device, a Read-Only Memory (ROM), a Random Access Memory (RAM), a magnetic disk or a compact disk, etc.

The above-mentioned embodiments are just preferred embodiments of the present document and are not used for limiting the protection scope of the present document. One skilled in the art may easily conceive of variation or replacement within the technical range disclosed by the present document, but such variation or replacement should be included in the protection scope of the present document. Therefore, the protection scope of the present document shall be subjected to the protection scope of the claims.

INDUSTRIAL APPLICABILITY

The present document provides a terminal support and a wireless charging device. The terminal support includes a base with a placing surface used for placing a terminal; a force generation module; and a control module connected to the force generation module, and the control module is configured to control the force generation module to generate a force which acts on the terminal to change a relative position relationship between the terminal and the placing surface. The present document further discloses a wireless charging device, including the terminal support. The terminal support provided by the present document controls the terminal placed on the base, the terminal and the placing surface are controlled to produce relative movement therebetween, and corresponding control can be performed according to a state parameter of the terminal or an instruction input by a user. Since the state parameter of the terminal can be indicated according to the relative position between the terminal and the placing surface, which facilitates intuitive judgment, realizes the visualization, thus the user experience is improved.

What we claim is:

1. A terminal support, comprising:
   a base with a placing surface used for placing a terminal;
   a force generation module; and
   a control module configured to control the force generation module to generate a force which acts on the terminal to change a relative position relationship between the terminal and the placing surface,
   wherein the terminal support further comprises a detection module connected with the control module, and the detection module is configured to acquire a detection signal of a state parameter of the terminal or an instruction input by a user, and send the detection signal to the control module to make the control module control the force generation module according to the detection signal to generate a force on the terminal.

2. The terminal support according to claim 1, wherein the state parameter of the terminal is a charging progress of the terminal or a working state of the terminal.

3. The terminal support according to claim 2, wherein the detection module comprises a camera, and the detection module is configured to acquire whether a distance between the user and the terminal is within a preset range.

4. The terminal support according to claim 1, wherein the force generation module is configured to apply one or a combination of a magnetic force, an attraction force and a repelling force to the terminal to change the relative position relationship between the terminal and the placing surface.

5. The terminal support according to claim 4, wherein the placing surface is a curved surface, a flat surface or a concave-convex surface.

6. The terminal support according to claim 5, wherein the force generation module comprises a first electromagnet and a second electromagnet, and the first electromagnet and the second electromagnet are located at different positions on the placing surface.

7. The terminal support according to claim 6, wherein the first electromagnet is located at a position of a first height on the placing surface, and the second electromagnet is located at a position of a second height lower than the first height on the placing surface.

8. The terminal support according to claim 7, wherein the force generation module further comprises a third electromagnet, and the third electromagnet is located at a position of a third height lower than the first height on the placing surface.

9. A wireless charging device, comprising the terminal support according to claim 1, and further comprising a wireless charging module connected with a control module and configured to perform wireless charging on a terminal placed on a placing surface.

10. The terminal support according to claim 2, wherein the force generation module is configured to apply one or a combination of a magnetic force, an attraction force and a repelling force to the terminal to change the relative position relationship between the terminal and the placing surface.

11. The terminal support according to claim 3, wherein the force generation module is configured to apply one or a combination of a magnetic force, an attraction force and a repelling force to the terminal to change the relative position relationship between the terminal and the placing surface.

* * * * *